United States Patent
Cheng et al.

(10) Patent No.: US 7,466,398 B2
(45) Date of Patent: Dec. 16, 2008

(54) OPTICAL NAVIGATION DEVICE AND METHOD THEREOF

(75) Inventors: Chia-Chu Cheng, Hsin-Tien (TW); Shih-Heng Lin, Hsin-Tien (TW); Rone-Hwa Chou, Hsin-Tien (TW); Jan-Yu Chen, Hsin-Tien (TW)

(73) Assignee: Lite-On Semiconductor Corporation, Taipei Hsien (TW)

( * ) Notice: Subject to any disclaimer, the term of this patent is extended or adjusted under 35 U.S.C. 154(b) by 49 days.

(21) Appl. No.: 11/707,913

(22) Filed: Feb. 20, 2007

(65) Prior Publication Data

US 2008/0198357 A1 Aug. 21, 2008

(30) Foreign Application Priority Data

May 19, 2006 (TW) .............................. 95117977 A

(51) Int. Cl.
*G01P 3/36* (2006.01)

(52) U.S. Cl. ........................................ 356/28; 356/28.5

(58) Field of Classification Search ................ 356/28, 356/3.01–3.15, 4.01–4.1, 5.01–5.15, 6–22, 356/28.5

See application file for complete search history.

(56) References Cited

U.S. PATENT DOCUMENTS

| | | | | |
|---|---|---|---|---|
| 4,272,189 A | * | 6/1981 | Bailey et al. | 356/28 |
| 5,048,950 A | * | 9/1991 | Metzdorff et al. | 356/3.01 |
| 2004/0109155 A1 | * | 6/2004 | Deines | 356/28.5 |

* cited by examiner

*Primary Examiner*—Thomas H Tarcza
*Assistant Examiner*—Luke D Ratcliffe
(74) *Attorney, Agent, or Firm*—Rosenberg, Klein & Lee

(57) ABSTRACT

An optical navigation device and a method thereof, wherein the optical navigation device comprises a pair of linear sensor arrays which are arranged non-parallel to each other for detecting light signal. Furthermore, an algorithm including correlation and vector analysis is processed by a computation unit to determine velocity and displacement according to present and previous light signal data sequences. Hence, the linear sensor arrays adapted to be the approach of navigation device can achieve the goal of reducing the computing data, increasing operation speed effectively and reducing hardware cost because of its fewer optically sensitive elements.

16 Claims, 4 Drawing Sheets

OPTICAL NAVIGATION DEVICE AND METHOD THEREOF

BACKGROUND OF THE INVENTION

1. Field of the Invention

The invention relates to optical navigation device and more particularly to image device and method thereof for using linear image sensor.

2. Description of the Prior Art

The optical metrology is generally applied today, especially with the image sensing technology which is adopted to determine the navigation and velocity. The specific applications are including optical mice, hand scanning device, and similar products.

The general optical navigation device comprises a light source adopted to emit light onto surface, and a detector adopted to receive the light reflected from the surface. The detector is usually a two-dimensional array formed by discrete optically sensitive element. A time series of images of detectable surface feature is acquired when the device moves relative to the surface. Thus, imaging processing is adopted to compare the variations between the presently and previously stored information. Then the displacement and motion direction are detected from the peak position of cross-correlation method between the outputs within the time series.

However, two-dimensional sensor array costs more than linear sensor array due to using more optically sensitive element. Besides, with the rapid advancement of image processing technology, the effective detector needs to increase the operation speed. Obviously, reducing the optically sensitive element can achieve the goal directly.

The inventor of the present invention recognizes the above shortage which should be improved and special effort has been made to research this field. The present invention is presented with reasonable design to resolve the problems mentioned above.

SUMMARY OF THE INVENTION

The primary object of the present invention is to provide an optical navigation device and a method thereof, wherein linear sensor arrays are separately adopted to detect a light signal reflected from a surface, and to determine the final vectors of displacement and velocity of the optical navigation device. Hence, the linear sensor arrays are adopted to detect the reflected light signal, and the operation data are fewer than that detected by a two-dimensional sensor so that operation speed for computing the a correlation or a image comparison is effectively increased because linear sensor arrays use fewer optically sensitive elements and reduce hardware costs.

To achieve the primary objective stated above, an optical navigation device of the present invention comprises a light source which illuminates a surface and the light reflects from the surface, a first linear sensor array and a second linear sensor array are adopted to detect the light signal reflected by the surface according to the system timing clock, and a data storage unit is adopted to store the light signal data sequences detected by the first linear sensor array and the light signal detected by the second linear sensor array, and a computation unit is connected with the data storage unit for computing correlation and vectors of displacement and velocity of the optical navigation device.

To achieve the primary objective stated above, an optical navigation method of the present invention comprises the steps of detecting a light signal by a first linear sensor array, and simultaneously detecting a light signal by a second linear sensor array, wherein the first linear sensor array and the second linear sensor array are arranged non-parallel to each other; storing the first light signal data sequences and the second light signal data sequences; computing a correlation or a image comparison between present and previous light signal data sequences of the first linear sensor array and the second linear sensor array respectively; computing the vectors of displacement and velocity in both the parallel directions of the first linear sensor array and the second linear sensor array; and processing the vectors of displacement and velocity produced from both the parallel directions of the first linear sensor array and the second linear sensor array to determine the final velocity and the displacement of the optical navigation device.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The above and further advantages of this invention may be better understood by referring to the following description, taken in conjunction with the accompanying drawings, in which.

The drawings will be described further in connection with the following detailed description of the present invention.

DETAILED DESCRIPTION OF THE PREFERRED EMBODIMENTS

Figure 1:
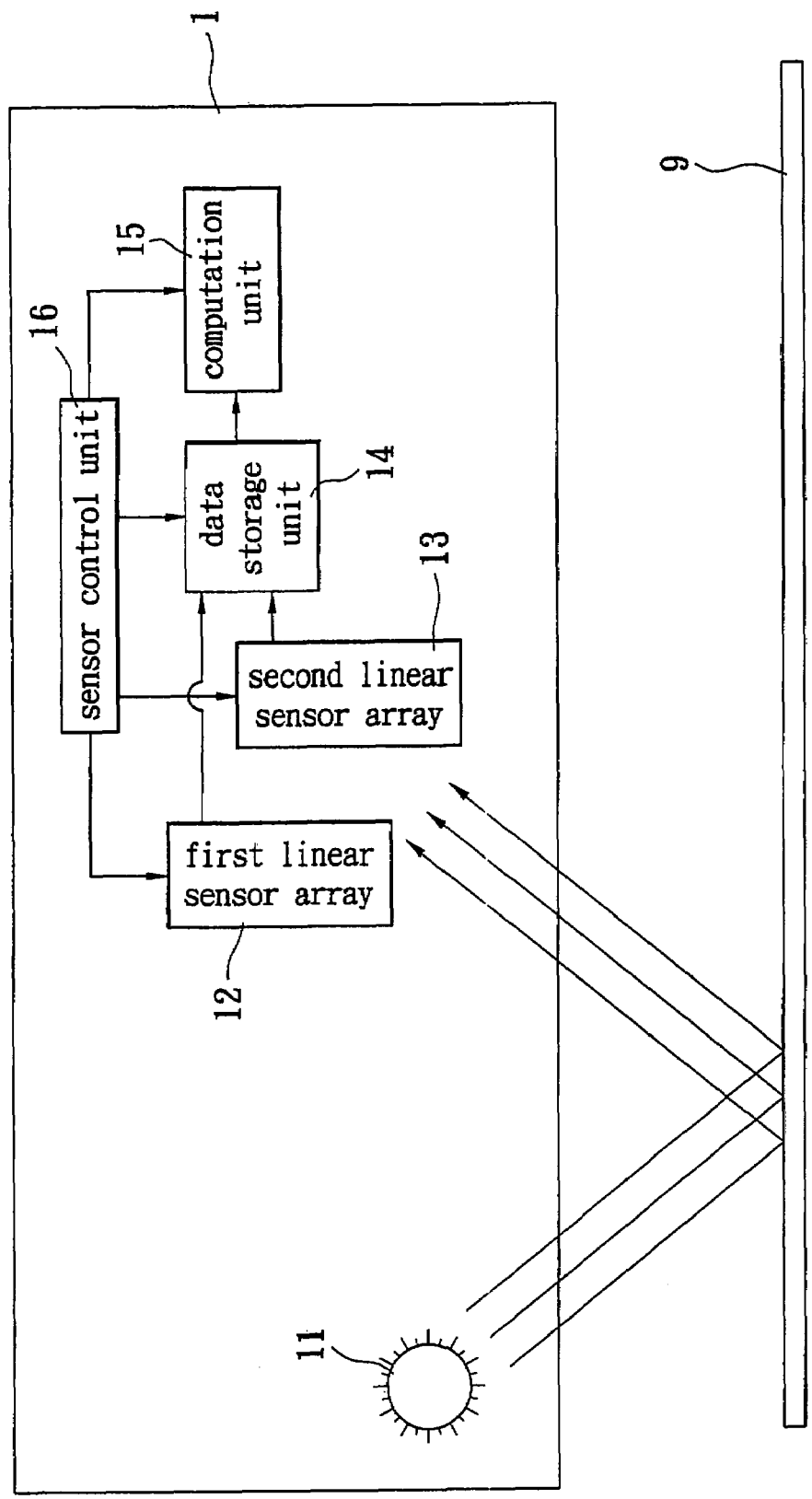
FIG. 1 is a function block diagram of an optical navigation device according to the present invention.

Reference is shown as in FIG. 1. It is a schematic view of a first preferred embodiment of a pair of linear sensor arrays according to the present invention. An optical navigation device 1 of the present invention comprises a light source 11, a first linear sensor array 12, a second linear sensor array 13, a data storage unit 14, a computation unit 15 and a sensor control unit 16. When the light is emitted from the light source 11 and illuminates a surface 9, a reflected light is reflected by the surface 9 to be a light signal detected by the first linear sensor array 12 and the second linear sensor array 13 according to a system timing clock. The first linear sensor array 12 and the second linear sensor array 13 are arranged non-parallel to each other and both have at least one optically sensitive element.

Figure 1A:
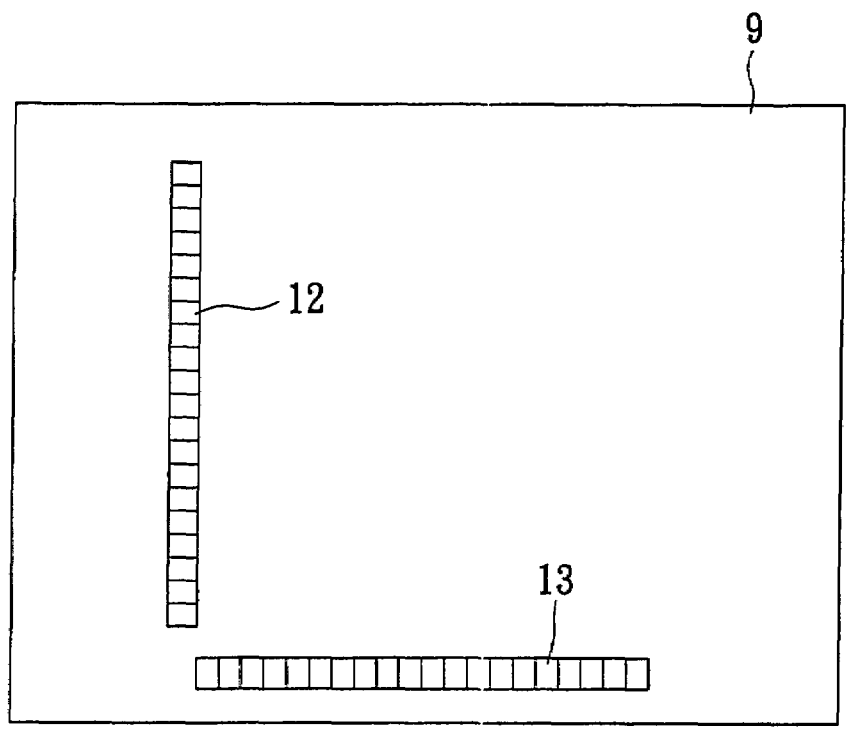
FIG. 1A is a schematic view of a first preferred embodiment of a pair of linear sensor arrays according to the present invention.
Figure 1B:
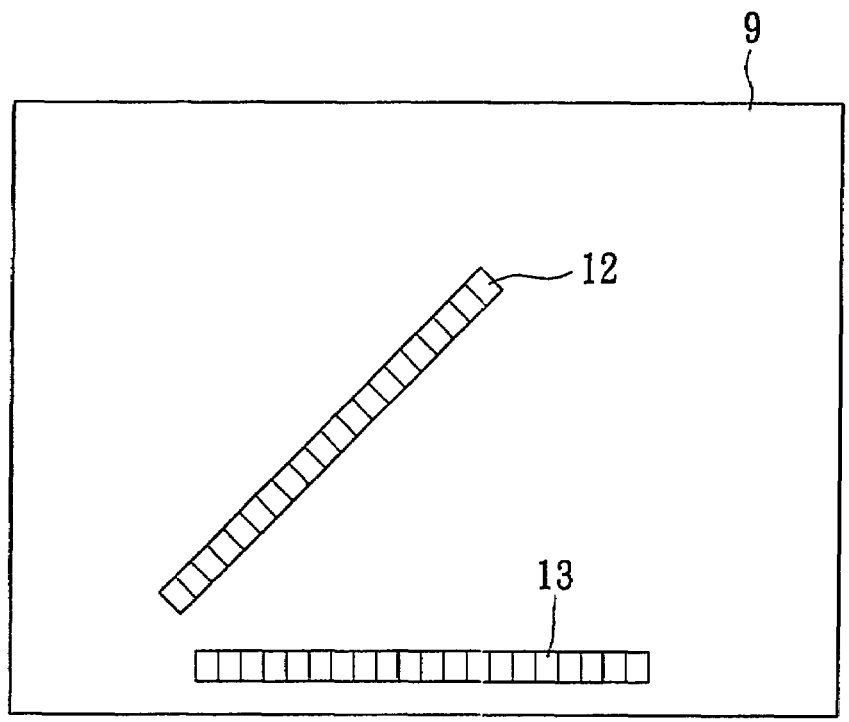
FIG. 1B is a schematic view of a second preferred embodiment of a pair of linear sensor arrays according to the present invention.

Reference is shown as in FIG. 1A. It is a schematic view of a first preferred embodiment of a pair of linear sensor arrays according to the present invention. FIG. 1A shows a bottom view of layout relation between the first linear sensor array 12 and the second linear sensor array 13. The first linear sensor array 12 and the second linear sensor array 13 are perpendicular to each other, and both are disposed in the optical navigation device 1 for detecting light signals reflected from the surface 9. Further reference is shown as in FIG. 1B. It is a schematic view of a second preferred embodiment of a pair of linear sensor arrays according to the present invention. FIG. 1B shows that the first linear sensor array 12 and the second linear sensor array 13 are arranged non-parallel to each other, and are disposed in the optical navigation device 1 for detecting light signals reflected from the surface 9. Both the first linear sensor array and the second linear sensor array have at least one optically sensitive element.

Further reference is shown as in FIG. 1. The first linear sensor array 12 and the second linear sensor array 13 detect light signals reflected from the surface 9 according to the system timing clock. Wherein the system timing clock is provided by the sensor control unit 16, and the sensor control unit 16 is connected with not only the first linear sensor array 12 and the second linear sensor array 13 but also the data storage unit 14 and the computation unit 15.

The above-mentioned light source 11 are some coherent light emitted from the devices such as laser diodes, vertical cavity surface emitting lasers (VCSELs), or resonant cavity light emitting diodes (RCLEDs). The coherent light illuminates the surface 9 and detected by the optical navigation device 1. The reflected light signal is a speckle image which is detected by the first linear sensor array 12 and the second linear sensor array 13. The light source 11 includes some incoherent light source such as a light emitting diode (LED) and a lens which are adopted to produce a surface image.

Figure 2:
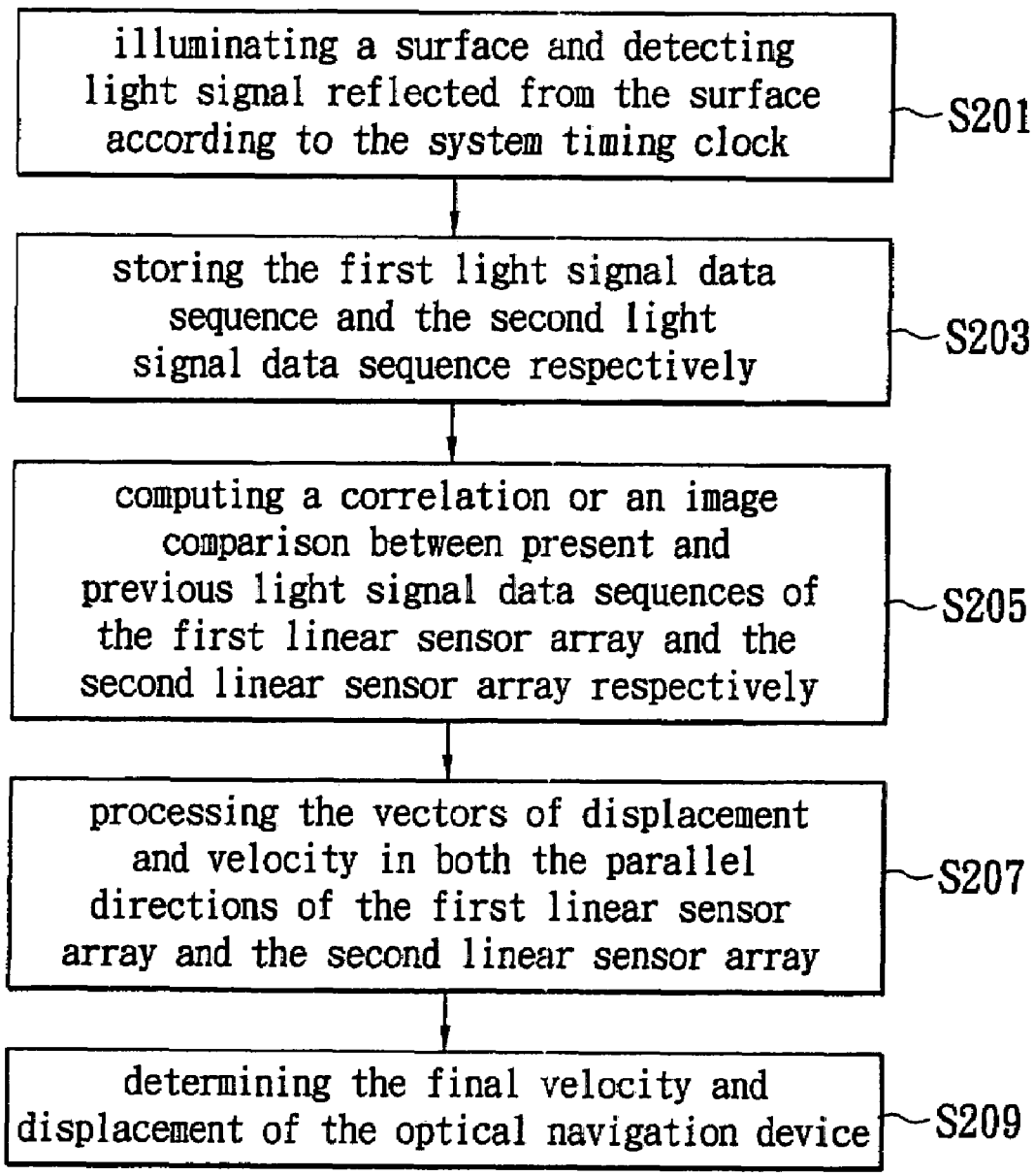
FIG. 2 is a flowchart of an optical navigation method according to the present invention.

Reference is shown as in FIG. 2, which is a flowchart of an optical navigation method according to the present invention. The optical navigation method comprises the steps including that: a light source 11 emits a light to illuminate a surface 9 and the reflected light is reflected by the surface 9 to be light signals; and the light signals are detected by the first linear sensor array 12 and the second linear sensor array 13 respectively; The first linear sensor array 12 and the second linear sensor array 13 detect light signals reflected from the surface 9 according to the system timing clock provided by the sensor control unit 16 (S201); the data storage unit 14 stores the first light signal data sequence and the second light signal data sequence respectively (S203); the computation unit 15 computes a correlation or an image comparison between present and previous light signal data sequences detected by the first linear sensor array 12 and the second linear sensor array 13 respectively (S205), and processes the vectors of displacement and velocity in both the parallel directions of the first linear sensor array 12 and the second linear sensor array 13 (S207); The above-mentioned algorithm includes a division operation or a differentiation operation. Finally, the vectors of displacement and velocity produced from both the parallel directions of the first linear sensor array 12 and the second linear sensor array 13 are used to determine the final velocity and displacement of the optical navigation device 1 (S209).

In the step (S207), the correlation between present and previous light signal data sequences is analyzed. In present invention, a first preferred correlation expression (formula 1) or a second preferred correlation expression (formula 2) which are adopted to execute correlation operations, and are shown as follow:

$$C_r(xlist, ylist) = \frac{\sum_i x_i y_i}{\sqrt{\sum_i x_i^2} \sqrt{\sum_i y_i^2}} \quad \text{(formula 1)}$$

Wherein, the $C_r$ is a correlation parameter, $x_i$ is a previously stored data array and $y_i$ is a presently stored data array $$C_r(xlist, ylist) = \frac{\sum_i (x_i - \bar{x})(y_i - \bar{y})}{\sqrt{\sum_i (x_i - \bar{x})^2} \sqrt{\sum_i (y_i - \bar{y})^2}} \quad \text{(formula 2)}$$

Wherein, the $C_r$ is a correlation parameter, $x_i$ is a previously stored data array, and $y_i$ is a presently stored data array, $\bar{x}$ is an average value of the previously stored data array and $\bar{y}$ is an average value of the presently stored data array.

Figure 3:
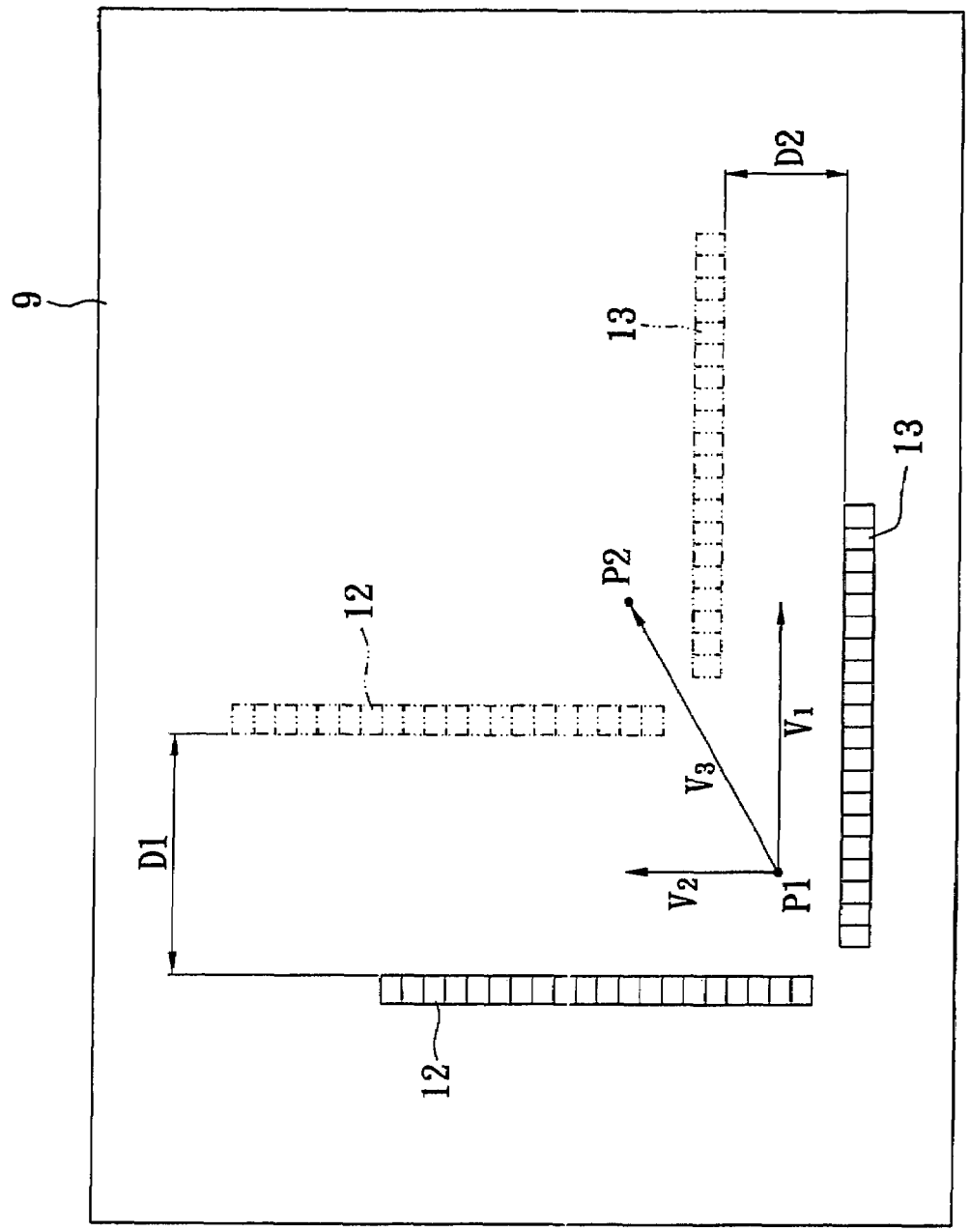
FIG. 3 is a schematic view of motion information detected from a pair of linear sensor arrays according to the present invention.

Reference is shown as in FIG. 3. It is a schematic view of motion information detected from a pair of linear sensor arrays according to the present invention. By means of the correlation operation, the vectors of displacement and velocity produced from both the parallel directions of the first linear sensor array 12 and the second linear sensor array 13 are used to determine the velocity and the displacement of the optical navigation device 1. A position P1 of the optical navigation device 1 is moved to a position P2 so that a displacement D1 and a displacement D2 can be calculated. And next, the system timing clock of the sensor control unit 16 computes time interval t that the optical navigation device 1 moves from the position P1 to the position P2. And next, a vector of velocity V1 related to the surface 9 in the parallel direction of the first linear sensor array 12 can be computed according to the displacement D1 and the time interval t, and a vector of motion velocity V2 related to the surface 9 in the parallel direction of the second linear sensor array 13 can be computed according to the displacement D2 and the time interval t. Finally, the vector of motion velocity V1 and vector of motion velocity V2 are processed by vector analysis, and hence a vector of velocity V3 can be obtained.

By the same way, both of the velocity and displacement of the optical navigation device can be computed in a way that the first linear sensor array 12 and the second linear sensor array 13 are arranged non-parallel to each other (shown in FIG. 1B).

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An optical navigation device, comprising:
   a singular light source adapted to illuminate a surface and a reflected light reflected by the surface adapted to be a light signal;
   a first linear sensor array adapted to passively detect the light signal according to a system timing clock;
   a second linear sensor array arranged non-parallel with the first sensor linear sensor array to passively detect the light signal according to the system timing clock; said second linear sensor array detecting the light signal independently of and simultaneously to the first linear sensor array; wherein, said first and second linear sensor arrays are independent of the singular light source;
   a data storage unit adopted to store the light signal detected by the first linear sensor array and the second linear sensor array; and
   a computation unit connected with the data storage unit and adopted to compute the velocity of the optical navigation device according to the light signal detected by the first linear sensor array and the second linear sensor array.

2. The optical navigation device as claimed in claim 1, wherein both the first liner sensor array and the second linear sensor array have at least one optically sensitive element.

3. The optical navigation device as claimed in claim 1, further comprising a sensor control unit which is connected with the first linear sensor array, the second linear sensor array, the data storage unit, and the computation unit, so as to provide the system timing clock.

4. The optical navigation device as claimed in claim 1, wherein the light source is a coherent light source.

5. The optical navigation device as claimed in claim 4, wherein the light source is a laser or a vertical cavity surface emitting laser (VCSEL).

6. The optical navigation device as claimed in claim 1, wherein the light signal is a speckle image.

7. The optical navigation device as claimed in claim 1, wherein the light source is a resonant cavity light emitting diode (RCLED).

8. The optical navigation device as claimed in claim 1, wherein the light source includes an incoherent light source and a lens adapted to produce an image.

9. The optical navigation device as claimed in claim 8, wherein the incoherent light source is a light emitting diode (LED).

10. The optical navigation device as claimed in claim 1, wherein the two linear sensor arrays are perpendicular to one another.

11. An optical navigation method, comprising the steps of:
passively detecting a light signal by a first linear sensor array, and simultaneously passively detecting a light signal by a second linear sensor array, wherein the first linear sensor array and the second linear sensor array are arranged non-parallel to each other, said second linear sensor array detecting the light signal independently of and simultaneously to the first linear sensor array storing the first light signal data sequences and the second light signal data sequences respectively;
computing a correlation or an image comparison between present and previous light signal data sequences of the first linear sensor array and the second linear sensor array respectively, computing the vectors of displacement and velocity in both the parallel directions of the first linear sensor array and the second linear sensor array; and
processing the vectors of displacement and velocity produced from both the parallel directions of the first linear sensor array and the second linear sensor array to determine the final velocity and displacement of the optical navigation device.

12. The optical navigation method as claimed in claim 11, further comprising a step that illuminating light on a surface and reflecting the light signals from the surface.

13. The optical navigation method as claimed in claim 11, wherein the velocity in both the parallel directions of the first linear sensor array and the second linear sensor array are determined by an algorithm of the displacement and the system timing clock.

14. The optical navigation method as claimed in claim 13, wherein the algorithm is a division operation or a differentiation operation.

15. The optical navigation method as claimed in claim 11, wherein the correlation between present and previous light signal data arrays is:

$$C_r(xlist, ylist) = \frac{\sum_i x_i y_i}{\sqrt{\sum_i x_i^2} \sqrt{\sum_i y_i^2}}$$

wherein, the Cr is a correlation parameter, xi is a previously stored data array and yi is a presently stored data array.

16. The optical navigation method as claimed in claim 11, wherein the correlation between present and previous light signal data arrays is:

$$C_r(xlist, ylist) = \frac{\sum_i (x_i - \bar{x})(y_i - \bar{y})}{\sqrt{\sum_i (x_i - \bar{x})^2} \sqrt{\sum_i (y_i - \bar{y})^2}}$$

wherein, the Cr is a correlation parameter, xi is a previously stored data array, and yi is a presently stored data array, is an average value of the previously stored data array and is an average value of the presently stored data array.

* * * * *

UNITED STATES PATENT AND TRADEMARK OFFICE
CERTIFICATE OF CORRECTION

| | | |
|---|---|---|
| PATENT NO. | : 7,466,398 B2 | Page 1 of 1 |
| APPLICATION NO. | : 11/707913 | |
| DATED | : December 16, 2008 | |
| INVENTOR(S) | : Chia-Chu Cheng et al. | |

It is certified that error appears in the above-identified patent and that said Letters Patent is hereby corrected as shown below:

On the Title Page, Item (75)

Please amend the Title Page Block [75] as follows:

Delete the fourth inventor name "Jan-Yu Chen" and insert the corrected spelling --Jau-Yu Chen--.

Signed and Sealed this

Twenty-first Day of July, 2009

JOHN DOLL
*Acting Director of the United States Patent and Trademark Office*